June 29, 1948.   A. VENDITTY   2,444,121
JOINT
Filed June 14, 1943   2 Sheets-Sheet 1
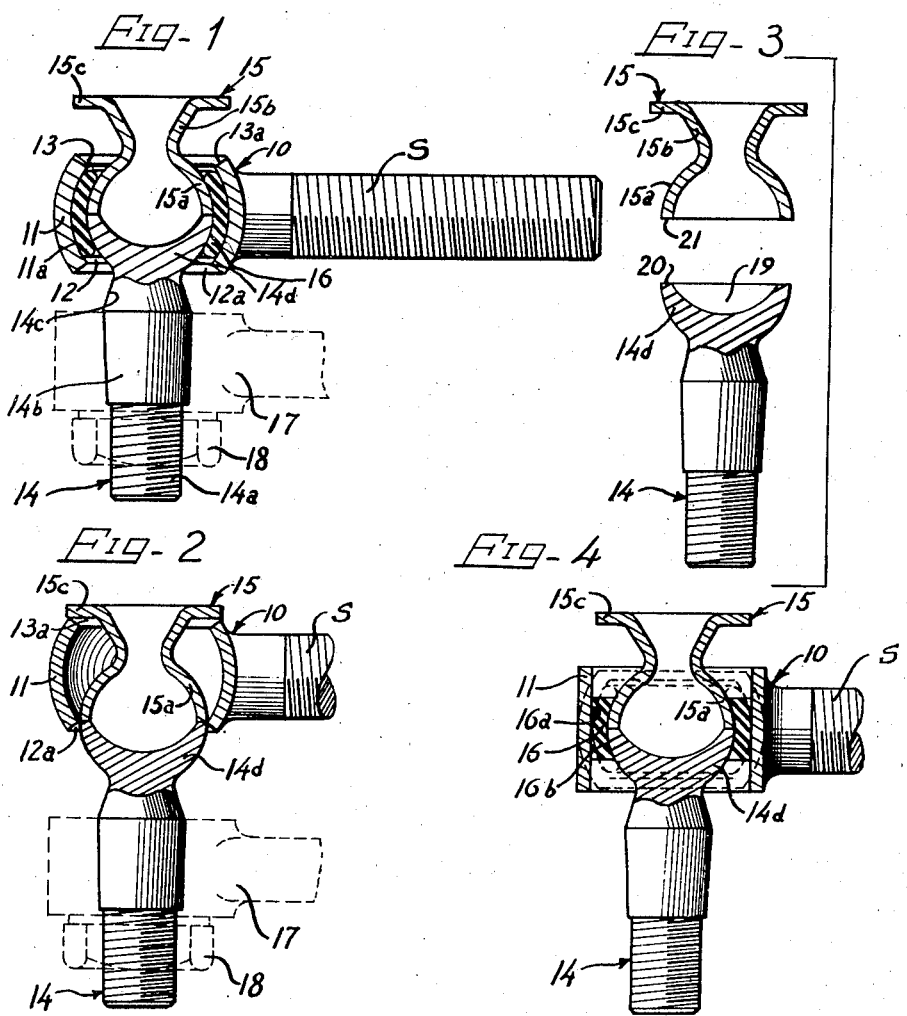
Inventor
ANTHONY VENDITTY
by
Attys.

June 29, 1948. A. VENDITTY 2,444,121
JOINT
Filed June 14, 1943 2 Sheets-Sheet 2
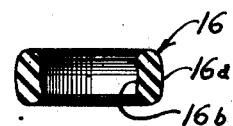
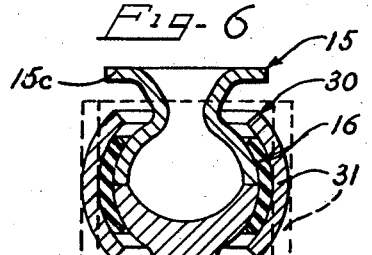
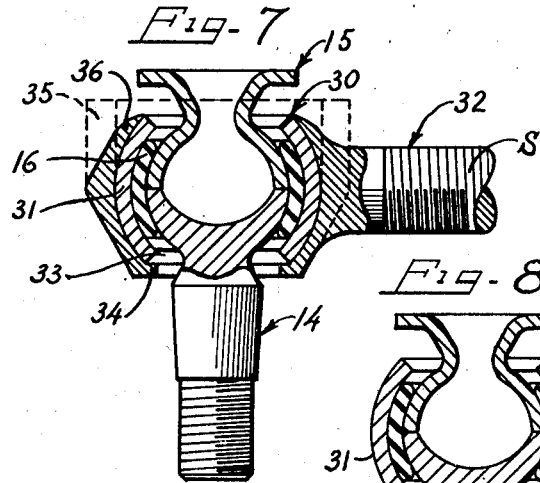
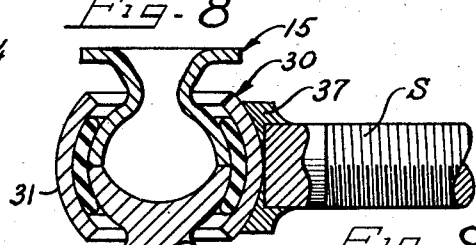
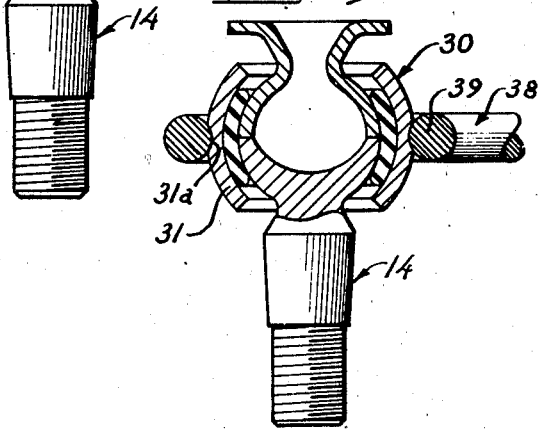
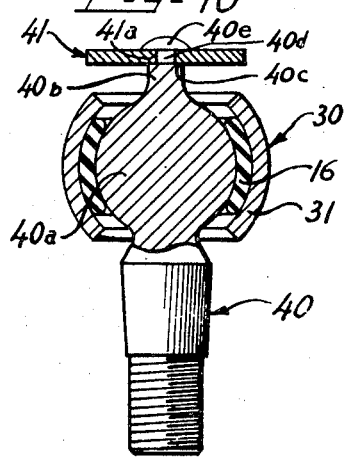
Inventor
ANTHONY VENDITTY
by Attys.

Patented June 29, 1948

2,444,121

UNITED STATES PATENT OFFICE 2,444,121

JOINT

Anthony Venditty, Detroit, Mich., assignor to Thompson Products, Inc., a corporation of Ohio Application June 14, 1943, Serial No. 490,726

3 Claims. (Cl. 287—85)

This invention relates to a joint construction having inner and outer members held in relatively movable relation by an interposed resilient bushing and equipped with normally spaced apart cooperating abutment surfaces adapted to thrust upon each other to maintain the members in assembled relation in the event of failure of the bushing.

Specifically the invention relates to a ball and socket type joint equipped with a rubber or other resilient bushing between the ball and the socket and having an extension on the ball member adapted to abut against the socket in the event of failure of the bushing so that the ball and socket will remain in assembled relation.

The invention will hereinafter be specifically described as embodied in a ball and socket tie rod joint, but it should be understood that the principles of this invention are not limited to such an embodiment, being generally applicable to joint constructions.

In accordance with this invention, the socket of a tie rod end or an insert for a tie rod end housing is initially provided with an open ended cylindrical socket chamber. A ball stud, composed of a semi-ball member butt-welded to a hollow semi-ball stamping with a neck portion and an outturned flange, or composed of a ball end with an extension carrying a disc, receives a rubber ring around the major diameter of the ball thereof. This rubber ring has an outer cylindrical wall and an inner segmental-spherical wall shaped to fit around the ball of the ball stud. The ball stud with the rubber ring therearound is inserted into the cylindrical socket chamber and the rubber ring is positioned in the chamber so that it lies in spaced relation from either open end thereof. The socket or insert is then coined into a generally ball-shaped contour by die-pressing the open ends thereof. This coining operation pre-loads the rubber bushing and causes the same to flow over a greater area of the ball portion of the stud. If an insert is used instead of an outer joint housing, a sub-assembly is provided that can be inserted into a housing or have a stem welded thereon to complete the tie rod end.

The ball stud is free to rotate and tilt relative to the socket and the preloaded or compressed rubber bushing will hold the assembly in operative relation. However, in the event that the rubber bushing becomes disintegrated, the flange or disc on the ball stud is adapted to abut an end of the socket thereby preventing removal of the ball stud from the socket.

In tie rod joints the socket of the tie rod end is carried by the tie rod, and the stud of the end is connected to a steering arm or the like. Since this steering arm is materially larger than the opening in the socket it will prevent removal of the stud from the socket in one direction while the flange on the stud abuts the socket upon movement of the stud in the other direction to prevent removal of the stud.

Therefore the present invention provides a tie rod end containing stud and socket parts which cannot be separated in operation even though a bearing or bushing in the tie rod end should fail.

It is, then, an object of this invention to provide a joint construction wherein the joint parts are held in assembled relation even though the bearing for such parts should fail.

Another object of the invention is to provide a tie rod end construction including a tie rod end socket and a stud cooperating with said socket wherein the stud and socket cannot be separated even though some of the parts should fail in operation.

A still further object of the invention is to provide a rubber bushed joint wherein the joint members cannot separate even though the rubber bushing should fail.

A still further object of the invention is to provide a ball and socket joint wherein the ball and socket have cooperating spaced opposed abutment surfaces adapted to thrust against each other in the event of failure of the joint and thereby prevent separation of the ball and socket.

A further object of the invention is to provide a rubber bushed ball and socket tie rod end wherein the ball stud has an outturned flange portion adapted to thrust against the socket in the event of failure of the rubber bushing for holding the stud in the socket.

A further object of the invention is to provide a ball stud having a ball end with an extension carrying an abutment flange adapted to hold the stud in a socket.

A further object of the invention is to provide a novel ball stud composed of a semi-ball ended member butt-welded to a semi-ball stamping having an outturned abutment flange.

Another object is to provide a sub-assembly for joints composed of a ball stud surrounded by rubber covered with and preloaded by a swedged metal sleeve forming a shell or casing for the sub-assembly.

Other and further objects of the invention will be apparent to those skilled in the art from the following detailed description of the annexed sheets of drawings which, by way of preferred examples only, illustrate several embodiments of the invention.

On the drawings:

Figure 1 is a side elevational view, with parts in vertical cross section, of a rubber bushed ball and socket tie rod end according to this invention.

Figure 2 is a view similar to Figure 1 illustrating the position of the parts in the event of disintegration of the rubber bushing.

Figure 3 is an exploded vertical cross-sectional view with a part in elevation, illustrating the members constituting the ball stud of this invention.

Figure 4 is a view similar to Figure 1 illustrating the manner in which the socket is deformed into spherical shape to preload the rubber bushing.

Figure 5 is an axial cross-sectional view of a rubber ring used in the joints of this invention.

Figure 6 is a side elevational view, with parts in vertical cross section, illustrating a sub-assembly according to this invention and showing, in dotted lines, the original shape of the insert or metal shell.

Figure 7 is a view similar to Figure 6 and showing the sub-assembly of Figure 6 mounted in a tie rod end housing.

Figure 8 is a view similar to Figure 6 and showing a stem welded on the metal insert or shell.

Figure 9 is a view similar to Figure 6 and showing the sub-assembly of Figure 6 carried in the eye end of a rod.

Figure 10 is a view similar to Figure 6 but illustrating a modified form of ball stud according to this invention.

As shown on the drawings:

In Figure 1 the numeral 10 designates generally a tie rod end socket having an eye portion 11 and a laterally extending externally threaded integral stem portion S. The stem portion S is adapted to be threaded into the end of a tie rod. The eye portion 11 has a segmental spherical inner wall 11a with the major diameter thereof intermediate the open bottom 12 and open top 13 of the socket. The openings 12 and 13 have diameters less than the major diameter of the wall 11a and are defined respectively by outwardly flaring rims 12a and 13a affording abutment surfaces.

A ball stud is composed of a headed shank 14 with a threaded end portion 14a, a tapered steering arm receiving portion 14b, a reverse tapered neck portion 14c, and a semi-ball end 14d plus a stamping 15 having a semi-ball end 15a butt-welded to the end 14d, a hollow extension portion 15b projecting beyond the ball end 15a and an outturned flange 15c on the end of the extension portion 15b. The ball provided by the portions 14d and 15a is seated in the eye 11 of the socket 10 and a rubber bushing 16 is disposed between the ball and the wall 11a.

As shown in dotted lines, the end 17 of a steering arm is seated on the portion 14b of the stud and a nut 18 is threaded on the portion 14a of the stud to hold the arm 17 on the stud. The end 17 of the arm is of larger diameter than the opening 12 while the flange 15c is of larger diameter than the opening 13.

As shown in Figure 1, the rubber bushing 16 holds the flange 15c in spaced relation from the rim 13a and also holds the end 17 of the steering arm in spaced relation from the rim 12a. As shown in Figure 2, however, in the event of failure of the rubber bushing, such as complete disintegration of the same, the flange 15c can abut the rim 13a and prevent the stud 14 from dropping out of the socket. In the reverse direction the arm 17 could likewise abut the rim 12a and prevent removal of the stud from the socket.

As shown in Figure 3, the head shank 14 has a semi-ball head 14d which can be readily formed by an upsetting operation and, in order to save metal, can have a recess 19 therein. The ball end 14d has a flat annular rim 20 therearound.

The member 15 can be formed from tubular metal stock and is completely hollow. The semi-ball end 15a thereof has a flat annular rim therearound adapted to mate with the rim 20. The rims 20 and 21 are brought together and are butt-welded to provide the ball end on the resulting stud assembly.

The extension 15b is sufficiently long to hold the flange 15c spaced away from the socket 10 during all normal movements of the joint.

As shown in Figure 4, the eye end 11 of the socket 10 is initially a straight cylindrical member. The rubber bushing 16 as best shown in Figure 5 is initially a rather thick rubber ring with a slightly convex outer wall 16a and with a concave or segmental spherical inner wall 16b. The outer wall 16a, as shown in Figure 4, snugly fits in the cylindrical eye end 11 and the inner wall 16b snugly fits around the major diameter of the ball end of the stud and extends for a distance on opposite sides of the weld area. The bushing 16 is initially slipped around the ball end of the stud and the ball with the bushing therearound is seated in the cylindrical eye end 11 to position the bushing in spaced relation from the open ends of the eye.

Dies or swedges (not shown) then act on the cylindrical end 11 of the socket to deform the same into the curved form shown in Figures 1 and 2 and also shown in dotted lines in Figure 4. The deformation of the eye end of the socket loads the bushing 16 compressively and causes the same to flow over a greater area of the ball end of the stud. At the same time the open ends of the socket are reduced in size so that the flange 15c cannot pass through either of these open ends.

If it is not convenient to deform the main outer housing of a tie rod joint as shown in Figure 4, a sub-assembly 30 of Figure 6 can be used. This sub-assembly 30 is composed of the welded together ball stud parts 14 and 15, the bushing 16 and a metal shell or insert 31 which is initially an open ended cylindrical sleeve, shown in dotted lines, deformed into ball shape by swedging, die pressing or the like. The shell 31 preloads the bushing 16 and causes it to cover a greater area of the ball stud as described above. The ball-shaped shell 31 has open ends smaller than the flange 15c so that the stud cannot drop out of the shell as explained in connection with Figure 2. These open ends are also smaller than the major diameter of the bushing 16.

The sub-assembly 30 can be used in many various ways in joints. For example as shown in Figure 7 it can be seated in a tie rod end housing 32 having the usual stem S and an open ended socket chamber 33 with an inturned flange or shoulder 34 at one end and an initially cylindrical portion 35 shown in dotted lines at the other end. The sub-assembly 30 is dropped through the cylindrical portion 35 into the socket chamber 33 with the shell 31 bottomed on the shoulder 34 and the portion 35 spun or peened over the shell as at 36 to secure the sub-assembly in the housing.

As shown in Figure 8 the sub-assembly 30 can be made with a stronger shell 31 and a stem S can be welded thereon as at 37 to provide a tie rod end.

As shown in Figure 9, the shell 31 of the sub-assembly 30 can have a groove 31a formed around its periphery and a rod 38 can be wrapped around the shell in this groove to provide an eye end 39 carrying the sub-assembly and providing a jointed link or the like.

In the embodiment of Figure 10 the sub-assembly 30 is equipped with a modified ball stud having a ball head 40a with an axial extension or neck 40b having a shoulder 40c and a reduced diameter stem 40d. A rigid disc 41 of metal or the like has a central aperture 41a receiving the stem 40d therethrough. The disc 41 is bottomed on the shoulder 40c and the projecting portion of the stem 40d is upset over the disc to form a head 40e holding the disc on the ball stud. The disc 41 is of larger diameter than the opening in the shell 31 and the bushing 16 normally centers the ball head 40a so that the projection 40b will hold the disc away from the shell even during normal relative tilting movements between the stud and shell but in the event of failure of the bushing the disc 41 will abut the shell 31 and prevent the stud from dropping out of the shell.

While it is preferred to use rubber for the bushing 16, it should be understood that synthetic rubber, resilient plastic material and other resilient bushings can be used in place of rubber.

The ball end of the stud is adapted to rotate and tilt in the bushing 16. The preloaded bushing is always held under compression load and therefore has long wear life. Since the bushing is preloaded "mushy" steering will not result from the use of the tie rod ends and looseness of the parts will not occur because the rubber will tend to reclaim its original thickness thereby taking up wear developed between the parts.

It will, of course, be understood that various details of construction may be varied through a wide range without departing from the principles of this invention, and it is, therefore, not the purpose to limit the patent granted hereon otherwise than necessitated by the scope of the appended claims.

I claim as my invention:

1. A ball stud comprising a member having a shank with a threaded end portion, a tapered portion, a reverse tapered neck portion and a semi-ball end, a second member having a semi-ball end butt-welded to the semi-ball end of the first mentioned member, a tubular extension on said second member, and an outturned flange on the end of said tubular extension.

2. A tie rod joint comprising a tie rod end housing having a socket and a sub-assembly secured in said socket comprising a unit including a ball stud and a hollow ball head, a shank projecting from one end of the head, a hollow extension projecting from the other end of the head, an outturned flange on said extension, a bushing surrounding the head and a shell covering said bushing and having open ends receiving the shank and extension freely therethrough, and said open shell end receiving the extension being reduced in diameter to a size smaller than said abutment flange to retain the stud in assembled relation to the shell.

3. A ball and socket joint comprising a stud having a shank with a semi-ball end, a member having a semi-ball end secured to the semi-ball end of the stud and cooperating therewith to define a ball portion for said stud, said member having a neck extending from said semi-ball end terminating in an outwardly extending flange, a resilient bushing surrounding the ball portion of said stud and a casing surrounding said bushing, said casing coacting with said ball portion to load and deform the bushing into conformity with the ball portion around an area of the ball portion that is larger than the area covered by the bushing in its free state, and said casing having opposed openings respectively receiving the stud shank and the neck portion freely therethrough, said opening receiving said neck portion being reduced in diameter to a size smaller than said outwardly extending flange to maintain the stud in the casing even when the bushing is destroyed.

ANTHONY VENDITTY.

REFERENCES CITED

The following references are of record in the file of this patent:

UNITED STATES PATENTS

| Number | Name | Date |
|---|---|---|
| Re. 18,843 | Skillman | May 30, 1933 |
| 1,732,657 | Pecquerez | Oct. 22, 1929 |
| 1,817,529 | Skillman | Aug. 4, 1931 |
| 1,827,267 | Short | Oct. 13, 1931 |
| 1,867,540 | Rosenberg | July 12, 1932 |
| 1,888,642 | Tryon | Nov. 22, 1932 |
| 1,913,198 | Geyer | June 6, 1933 |
| 1,940,885 | Rosenberg | Dec. 26, 1933 |
| 1,983,796 | Geyer | Dec. 11, 1934 |
| 1,990,016 | Alden | Feb. 5, 1935 |
| 2,027,560 | Skillman | Jan. 14, 1936 |
| 2,056,257 | Crawford | Oct. 6, 1936 |
| 2,096,557 | Pev | Oct. 19, 1937 |
| 2,122,839 | Guy | July 5, 1938 |
| 2,292,675 | Thiry | Aug. 11, 1942 |
| 2,304,595 | Prentice | Dec. 8, 1942 |
| 2,350,398 | Hufferd | June 6, 1944 |

FOREIGN PATENTS

| Number | Country | Date |
|---|---|---|
| 32,735 | Austria | Apr. 1908 |
| 48,293 | Norway | Aug. 11, 1930 |
| 473,254 | Great Britain | Oct. 8, 1937 |